Jan. 14, 1958  G. R. EITNER  2,819,914
FLUID LINE COUPLING DEVICE
Filed March 17, 1955
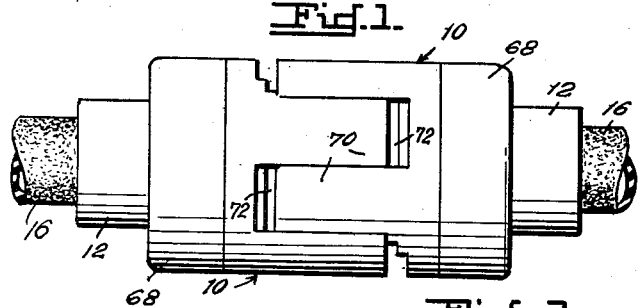
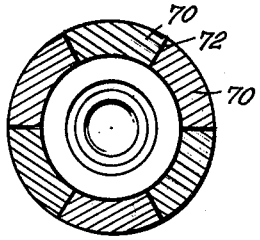
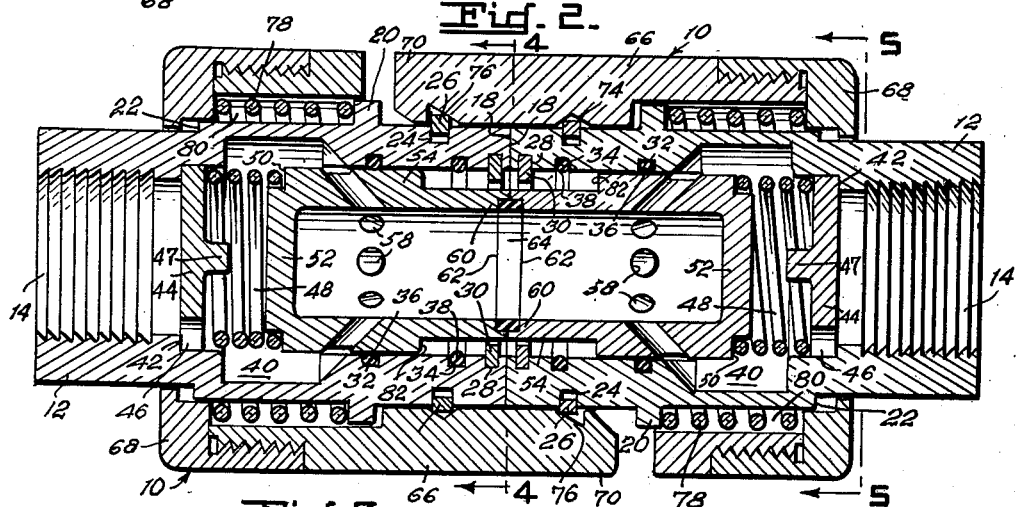
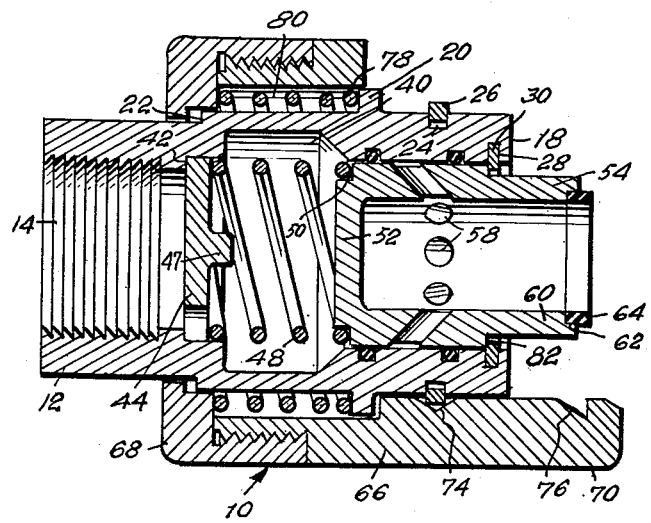
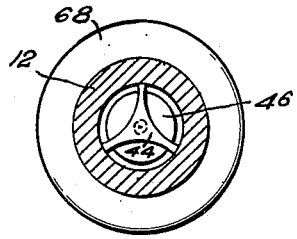
INVENTOR.
George R. Eitner
BY
W. E. Thibodeau + A. W. Dew
ATTORNEYS
and R. M. Lyon
AGENT

United States Patent Office 2,819,914
Patented Jan. 14, 1958

2,819,914

FLUID LINE COUPLING DEVICE

George R. Eitner, New Baltimore, Mich., assignor to the United States of America as represented by the Secretary of the Army Application March 17, 1955, Serial No. 495,074

1 Claim. (Cl. 285—70)

(Granted under Title 35, U. S. Code (1952), sec. 266)

The invention described in the specification and claim may be manufactured and used by or for the Government for governmental purposes without the payment to me of any royalty thereon.

This invention relates generally to couplings and more particularly to manually connectable and disconnectable fluid line couplings particularly suitable for connecting the extremities of two portions of fluid lines between moving vehicles.

Existing fluid line coupling devices of this nature and as shown in the prior art with which I am familiar have one or more certain disadvantages or undesirable characteristics such as lack of strength or of simplicity or of durability, resulting in damage and high maintenance cost; inability to retain an effective coupling regardless of the amount of pressure in the fluid lines; failure to provide quick, easy, non-rotatable manual connectability and disconnectability of the mating coupling portions; uneconominal manufacture through failure to utilize a minimum number of parts; and are subject to accumulation of grit, dirt and corrosion making difficult or impossible manual disconnection of the mating coupling parts.

It is accordingly the general object of this invention to overcome the foregoing and other disadvantages and undesirable characteristics of existing or heretofore known fluid line coupling devices by providing a fluid line coupling which is simple, rugged, durable, economical in manufacture and maintenance; which is effective in providing a positive strong locked coupling of fluid lines regardless of amount of pressure therein; and which at all times is readily and easily manually connectable and disconnectable by simple straight-line, relative sliding manual movement of the mating portions of the coupling with accompanying automatic respective opening or sealing of the fluid line portions.

In accordance with the foregoing, an object of this invention is to provide a fluid line coupling having two identical coupling units or halves each unit or half and all parts thereof being identical and interchangeable with the other unit or half and corresponding parts thereof, said identical coupling units being provided with complementary laterally extending latch and slot portions slidably interfitting for manual non-rotatable coupling or uncoupling.

Another object of this invention is to provide a fluid line coupling of two identical units or halves of generally cylindrical construction having axially extending circumferentially spaced latch portions slidably and contiguously meshable manually to a connected positively locked end-to-end position in a coupling assembly of generally cylindrical smooth contour.

Another object of this invention is to provide a fluid line coupling of two identical units or halves each having therein a spring loaded valve member automatically seating or unseating to respectively prevent or establish fluid communication upon manual relative sliding axial straight-line interfitting movement of complementary latch and slot portions of the units or halves to respective uncoupled or coupled positions thereof.

Other objects of this invention will become apparent from the following detailed description illustrating one embodiment of this invention in accordance with the accompanying drawings in which:

Fig. 1 is a view in elevation of my novel assembled coupling with portions of a fluid line connected thereto;

Fig. 2 is an enlarged vertical sectional view of the assembled coupling of Fig. 1;

Fig. 3 is an enlarged vertical sectional view of an uncoupled one of the two units or halves of the coupling of Figs. 1 and 2;

Fig. 4 is a view in cross section on a plane indicated by the line 4—4 of Fig. 2; and Fig. 5 is a view in cross section on a plane indicated by the line 5—5 of Fig. 2.

Referring now in detail to the drawings, it will be seen as best illustrated in Fig. 2 that the assembled coupling is composed of two identical coupling units or halves 10, one unit 10 being illustrated in uncoupled position in Fig. 3, and that each of the identical units 10 has correspondingly numbered identical interchangeable parts.

Each of the units 10 has a generally tubular or cylindrical open body 12 adapted to receive at one end thereof as by threads 14 an extremity of a fluid line 16, portions of which are shown in Fig. 1. The other end of each body 12 at the circular opening therein has a flat surface 18 defined by the inner and outer circumference of body 12 and providing abutment in large area with the corresponding surface 18 of the corresponding end of the other body 12 in the assembled coupling as shown in Fig. 2. On the exterior of each body 12 is formed a circumferential outwardly extending stop member 20 and a circumferential shoulder 22, for a purpose hereinafter described. Also on the exterior of each body 12 and surrounding the latter is a spaced circumferential groove 24 having therein a snap ring 26 of a material such as spring steel and normally extending outwardly beyond the confines of the groove 24 but adapted to be contracted by force and to thus move inwardly toward the inward bottom of the groove 24 until the outer surface of the snap ring 26 is flush with the adjacent outer surface of body 12. On the interior of body 12 is a groove 28 and snap ring 30 therein, in all respects similar to foregoing groove 24 and snap ring 26 except that snap ring 30 normally extends inwardly beyond the outer confines of groove 28 but is adapted to be expanded by force and to thus move outwardly toward the outer bottom of groove 28 until the inner surface of snap ring 30 is flush with the adjacent inner surface of body 12. Also in the interior of body 12 are circumferential grooves 32 and 34 in which are respective compressible inwardly extending circumferential sealing rings 36 and 38 known as O rings, of suitable compressible resilient sealing material for example the synthetic rubber material known as "neoprene," although the particular material which is suitable will of course be limited by or depend upon the type of fluid in the fluid line, for example air, water, oil or fuel, which must have no deleterious effect upon the material used. Also in the interior of body 12 is a formed annular recess 40 providing fluid passage, and adjacent to recess 40 is a shoulder portion 42 accommodating a spring support 44.

In the interior of body 12, spring support 44 with fluid passage openings 46 therein and centrally axially projecting stop portion 47 thereof provides support for valve spring 48 bearing at one end thereof on shoulder 50 of the closed end 52 of generally cylindrical valve 54 with shoulder 82 thereof which is mounted relatively axially slidable within body 12 and bearing on compressed sealing rings 36 and 38 thus preventing fluid leakage between the cylindrical outer wall of valve 54 and inner wall of body 12. Referring particularly to Fig. 3, it will be seen that when unit 10 is in uncoupled position, valve spring 48 normally urges valve 54 to a limited outer position with valve shoulder 82 bearing on snap ring 30. Extending radially and diagonally outward from the interior and through the cylindrical wall of valve 54 are a plurality of spaced fluid passages 58 which it will be seen are not in communication with recess 40 when unit 10 is in uncoupled position (Fig. 3), but are in such communication when the two units 10 are in coupled position (Fig. 2). At open end 60 of the valve 54, and on a shoulder of recess 62 therein is seated or secured a compressible resilient seal ring 64 of suitable material such as that of sealing rings 36 and 38, seal ring 64 extending axially slightly beyond the end 60 of valve 54.

Mounted relatively axially slidable on and surrounding each of the two bodies 12 is a generally cylindrical retainer 66 held in place by retainer ring nut 68 thereon. The retainers 66 comprise to a great extent mutually interfitting axially extending latch members 70 and slots 72, these being interfitting upon relative axial manual end-to-end movement together of the two bodies 12 or units 10, the drawings illustrating three such latch members 70 and three such slots 72 for each retainer 66. Referring particularly to Fig. 1, it will be seen that the latch members 70 of one of the units 10 are contiguously meshable with the latch members 70 of the other of the units 10 upon their connection to provide a generally smooth external contour. Two internal circumferential properly shaped radially inwardly extending grooves 74 and 76 in the latch members 70 provide two jaws in each thereof for locked gripping of respective snap rings 26 on both units 10. A retainer spring 78 under slight compression surrounds body 12 within an inner recess 80 formed in retainer 66, retainer spring 78 bearing at one end thereof on stop member 20 and at the other end thereof on retainer ring nut 68. It will be seen that relative axial sliding movement of retainer 66 and body 12 is limited in one direction by ring nut 68 and shoulder 22, and in the other direction by stop member 20.

In the assembly of the parts of one of the units 10, spring support 44 is located on shoulder portion 42, and valve spring 48 is then inserted so that one end thereof bears on support 44. Valve 54 is then inserted after manually expanding snap ring 30 and moved axially until its shoulder 50 bears on valve spring 48 and its shoulder 82 moves past snap ring 30 allowing the latter to contract. Retainer spring 78 is placed on body 12 and bearing at one end on stop member 20 of the latter, and retainer ring nut 68 is then placed in proper position on body 12 adjacent the other end of spring 78. Retainer 66 is then slidably placed over body 12 and is moved relatively axially until snap ring 26 expands into groove 74 forming one of the jaws of latch members 70. Nut 68 is then adjustably tightened on retainer 66. With the parts thus assembled, the structure will be as shown in Fig. 3 with the parts in the relative position maintained when the units 10 are disconnected or uncoupled. It will be seen that in this position valve 54 is effectively seated against snap ring 30; fluid passages 58 are not in and are sealed against any communication with recess 40; and if a fluid line 16 containing fluid is attached as by threads 14 to the unit 10, there is an effective seal preventing any leakage of fluid from within, or from without, the unit 10.

Coupling, or assembly of the complete coupling, is accomplished by manual relative axial end-to-end movement together of two of the identical units 10. With axially extending latch members 70 of one unit opposite complementary slot members 72 of the other unit, the units are moved manually axially together with the latch members of one unit interfitting into corresponding complementary slot members of the other unit, latch members thus being respectively contiguously meshable, until the respective seal rings 64 of the units are abutting and compressed, providing an effective seal, with valves 54 unseated, whereupon snap ring 26 of one unit will expand into the gripping jaws formed by the groove 76 in the latch members 70 of the other unit, thus providing a positively locked and sealed coupling as illustrated in Fig. 2, with bodies 12 abutting at their end surfaces 18 and with fluid passages 58 of both units in communication with respective recesses 40 and respective extremities of fluid line 16, thus effecting unrestricted flow of fluid through the fluid line 16 and the coupling. It will be noted that projections 47 prevent any overtravel of valves 54 which might otherwise result from excessive intermittent pressure.

Uncoupling or disconnection of the coupling is effected by means of a slight manual relative straight-line axial movement of the units 10 further together, i. e., with nuts 68 thus approaching shoulder 22 as a limit and against the force of springs 78 such that while there is no relative movement of the abutting bodies 12, there is relative movement with respect thereto of retainers 66, whereupon snap rings 26 will be forcibly contracted into respective grooves 24, out of the jaws formed by, and by reason of the shape of, grooves 74 and 76 of the latch members 70. If now while in this position manual pressure against springs 78 is suddenly released, units 10 will be disconnected since there will then occur not only relative movement of retainers 66 and bodies 12 due to the action of springs 78 but also a temporarily lesser but nevertheless some relative movement of the bodies 12 from their abutting position, resulting in snap rings 26 being compressed in grooves 24 for a time sufficient to enable sliding clearance of the rings 26 by the grooves 76 of the latch members. There is thus effected an easy manual separation of the units 10 each of which thereupon will automatically have its parts relatively arranged as in Fig. 3 and as above discussed.

It will be apparent from the foregoing that this invention provides a coupling which is quickly and easily manually operated by only straight-line non-rotary relative movement of the coupling portions for positively locked connection or for disconnection thereof; a coupling with outer surface smooth and unbroken by projecting and exposed flanges, protuberances or parts which if projecting or exposed would be subject to damage or breakage with resulting high maintenance costs; a coupling of such structure that entrance of grit and dirt and the formation of corrosion, which would make manual operation difficult or impossible, is prevented or relatively greatly retarded; a coupling having a structure which is simple, strong and durable; and a coupling of which may be economically manufactured and stock piled by employing identical coupling units or halves each one of which has a minimum number of parts each identical and interchangeable with a corresponding part of the other of the units or halves.

Various changes may be made in the foregoing described specific embodiment of this invention without departing from the spirit thereof or from the scope thereof indicated by the appended claim.

What is claimed is:

In a fluid coupling of the type described, two structurally identical coupling units of generally cylindrical form connectable axially at respective connecting end portions thereof, means for connecting said two units comprising adjacent each respective end portion thereof, an annular retainer member axially slidable upon said unit, shoulders formed on said unit engageable by said retainer member limiting the axial movement thereof, a plurality of alternate circumferentially spaced and axially extending latch members and slots formed on said retainer member, the latch members and slots of one of said units being contiguously interfitting with corresponding slots and latch members of the other of said units upon relative axial movement of the two units, and locking catch means axially fixed on each of said units engageable by the latch members of the other unit upon relative axial movement of said retainer members and biasing means acting on said retainer members maintaining engagement of said latch members and locking catch means.

References Cited in the file of this patent

UNITED STATES PATENTS

| Re. 8,337 | Gardner et al. | July 16, 1873 |
| 139,223 | Wilson et al. | May 20, 1873 |
| 165,415 | Henderson | July 13, 1875 |
| 410,547 | Hanson | Sept. 3, 1889 |
| 416,767 | Walker | Dec. 10, 1889 |
| 809,746 | Rhoads | Jan. 9, 1906 |
| 882,017 | Pulliam | Mar. 17, 1908 |
| 1,484,192 | Rinquist | Feb. 19, 1924 |
| 2,333,423 | Hufferd | Nov. 2, 1943 |